UNITED STATES PATENT OFFICE.

HARVEY W. WILEY, OF WASHINGTON, DISTRICT OF COLUMBIA.

COMPOSITION OF MATTER FOR PREPARING FOODS AND PROCESS OF MAKING SAME.

1,230,452.   Specification of Letters Patent.   Patented June 19, 1917.

No Drawing.   Application filed March 7, 1917. Serial No. 153,100.

*To all whom it may concern:*

Be it known that I, HARVEY W. WILEY, a citizen of the United States, residing at Washington, in the District of Columbia, have invented certain new and useful Improvements in Compositions of Matter for Preparing Foods and Processes of Making Same, of which the following is a specification.

This invention relates to compositions of matter and processes of making same; and it comprises as a new material a leavening or effervescent composition composed of a carbonate, which is best bicarbonate of soda (sodium bicarbonate or sodium hydrogen carbonate) or calcium carbonate (carbonate of lime), and a dry acid skimmed milk of high acidity, these materials being either thoroughly mixed to make one powder or being put up as equivalent separated powders ready for admixture; and it comprises a process of making such a material wherein skimmed milk is artificially soured, which is best done by the well known *Bacillus Bulgaricus*, is then beaten up to an impalpable cream, this cream dried by one of the quick processes to form a dry powder which may be reground if necessary, and this dry powder mixed or assembled with the equivalent amount of bicarbonate or the like; a filler being used if desired when the two are mixed: all as more fully hereinafter set forth and as claimed.

In the ordinary manufacture of baking powders, it is the custom to use bicarbonate of soda and an acid material equivalent to it, together with as much filler as may be necessary to keep the preparation dry and remove danger of interaction, this filler being usually starch. The acid ingredient of the baking powder is varied; but in practically every case it is something like cream of tartar, alum, acid phosphate, etc., which is foreign to ordinary food materials and which contributes no desirable taste or nutritive value to the baking powder.

I have found that I can prepare a better material with nutritive value of its own and a pleasant flavor by using as the acid ingredient a special material. This material is pulverulent, artificially soured, skimmed milk of high acidity.

In making this acid ingredient I first ferment skimmed milk artificially with a suitable organism. The well known *Bacillus Bulgaricus* is very well adapted for my purposes by reason of the high acidity which it develops and the nutritive and other values of the product. However, other lactic acid producing bacteria and other organisms may be used, such as *Bacillus lactis*. The lactic acid producing organisms naturally found in milk may of course be used but they rarely develop as much acidity as I here desire; neither is the flavor of the material as good as that produced with *B. Bulgaricus*. I therefore find, since the value of any food preparation depends very largely on its flavor, *B. Bulgaricus* best adapted for my purposes. I ordinarily push the fermentation as far as possible, developing as great acidity as I can. The fermentation may be conducted with the usual precautions to prevent infection by foreign organisms and may be followed acidimetrically. After the fermentation is complete or has gone as far as may be desired, the curd is beaten up to an impalpable cream or the fermented product is otherwise homogenized. The creamy material thus produced is dried by one of the modern quick drying processes, being, for instance, dried on a rotary steam heated drum, atomized into heated air, etc. The resulting dried product, if not already an impalpable powder, is ground to as fine a mesh as possible. The subsequent treatment depends upon the particular product which is desired. In making a baking powder, it may be intimately mingled with a proportion of bicarbonate of soda or of precipitated lime carbonate corresponding to its acid value and, if desired, the mixture then diluted with 10 or 15 per cent. of a filler, this filler being best dried milk or dried skim milk, although milk sugar, starch and other fillers may be employed. When such a baking powder is employed in making bread, biscuits and the like, it contributes a pleasant flavor of its own; this pleasant flavor however not being the acid flavor of the original material where such material is used with the equivalent quantity of bicarbonate. In the bread making operation the lactic acid is neutralized by the soda or lime. If in addition the acid flavor of the dried material is desired, it may be obtained by simply diminishing the amount of bicarbonate of soda (or carbonate of lime, as the case may be) somewhat below the amount equivalent to the acid, or by increasing the amount of dried acid skim milk, thereby leaving a certain amount of free lactic acid. It will be observed that by this expedient I may obtain bread, cake, etc., with a pleasant acid flavor. A like flavor cannot be obtained with the other acid materials usually employed in baking powders.

With the dried, acid, fermented material mentioned, I can produce numerous other useful products in addition to baking powder. As stated, its flavor is very pleasant and it may be used as it is in many food preparations. In using it in connection with the preparation of food articles for leavening purposes, it is of course not necessary that the bicarbonate of soda or carbonate of lime be directly mixed with it, since the two may be put up in separate portions in separate papers and mixed directly before use or mixed in the food itself.

Whether sodium bicarbonate or precipitated carbonate of lime be used as the gas-giving component of the preparation, the residue after action is a lactate having nutritive and therapeutic value. Unlike most of the residual compounds formed with the usual baking powders they cause no stomachic disturbance; and they have instead a positive food value as well as a value against acidosis. Lactate of lime is particularly valuable as a lime carrier contributing toward bone and tooth formation and as correcting the deficiency in lime of many foods; and in particular those which have passed through modern methods of preparation; most of which have more or less of what may be called a demineralizing tendency.

Lactate of soda is more suitable for digestion than any other sodium salt, lactic acid being a normal constituent of foods; and similarly lactate of lime (or lactate of calcium) is more suitable for digestion and assimilation than any other lime salt.

Precipitated carbonate of lime is advantageous where a slowly-reacting preparation is required, the acid of the fermented dried material reacting less rapidly with it than with bicarbonate of soda. The latter is better where a quickly acting preparation is required. With carbonate of lime, some or much of the carbon dioxid may be liberated during the baking operation.

I however regard the manufacture of a baking powder composed of the stated dried, powdered, artificially soured, skimmed milk with the equivalent quantity of bicarbonate of soda or carbonate of lime with or without dried milk or skim milk powder as an extra filler as the most advantageous embodiment of my invention.

Much of the value of milk as a food is due to its lime which, as stated, functions as a bone and tooth building body. And in the present preparation this value is preserved. If the gas forming ingredient employed be calcium carbonate, of course somewhat more lime is added to that naturally present. The milk also contains a variety of other bodies useful in nutrition and in structure building. These occur in the present material.

Taking skimmed milk of a good grade, it may be said to average about 9 per cent. of total solids of which 5 per cent. is milk sugar; the remaining 4 per cent. being casein and mineral matter including lime, phosphates, etc. On fermentation of such a milk the acidity may be carried to around 3 per cent. of lactic acid; and on drying a good commercial product may be obtained with as little as 6 per cent. moisture. This material will carry about 40 per cent. lactic acid. If the acid fermentation be not carried quite so far there will be somewhat less. This is sometimes desirable. As stated, the matters other than lactic acid which are present are desirable because of their nutritive and other values; and they also have a function in a leavening composition corresponding to that of the filler in the ordinary types of baking powders. And where it is desirable to have considerable "filler" and to make a preparation of great keeping qualities under trying conditions it is desirable to carry the acidity to a point giving a dry powder with less than 40 per cent. lactic acid; say 30 per cent. or even 25 per cent. Ordinarily however I contemplate a material with between 35 and 40 per cent. lactic acid.

A good preparation may be made from about 4 parts sodium bicarbonate and about 9 parts of the described dried sour milk carrying around 40 per cent. of lactic acid. This preparation will leave a non-acid tasting residue having however otherwise the pleasant flavor of the milk. By taking 4 parts of bicarbonate and 10 or 11 parts of the dried sour milk of the same strength, the residue will have a slight acid flavor. With precipitated calcium carbonate about 3 parts of dried sour milk of the same degree of acidity may be used for 1 part of calcium carbonate to make a non-acid residue. An acid tasting pleasant flavoring material is obtained by increasing the amount of dried sour milk slightly, say, 4 parts to 1 part of precipitated carbonate of lime. Wide variations in the proportions of the two components of my leavening compositions may be made within the purview of the present invention.

As stated, the acid component and the gas giving component of my leavening preparation may be intimately admixed, with or without extra filler; or they may be assembled as two small separately packaged portions to be mixed at the time of use.

It will be noted that in the present leavening composition all the components are of food value and nothing foreign to the bodily needs is introduced, wherein it differs from the ordinary baking powders. The phosphate powders, the tartrate powders and the alum powders all leave residues which are of little food value and some of which are commonly regarded as harmful in their nature. Nearly all the food value of ordinary baking powder consists in the starch which is used as a filler. The present preparation in addition to its high nutritive value keeps well: not only because the presence of the free lactic acid in the milk component tends to inhibit bacterial development but because said lactic acid component is shielded against premature reaction with the carbonate component in a way which can not be attained with ordinary baking powders by the use of filler. In the present preparation the lactic acid is uniformly and homogeneously distributed throughout a protecting mixture of sugar, casein, mineral components, etc., in a way which can not be attained by any mechanical mixing. In the ordinary baking powder the mixing is of course mechanical and the shielding action of the filler is also more or less physical; it is due to the fact that the grains of starch or the like lie between and separate the grains of carbonate from the grains of acid component.

When used in making cake, bread, griddle cakes, etc., the present preparation must be considered as something more than merely a leavening agent; it is used as a part of the final food; it not only adds food value but a character of its own. In a way, it may be said not only to be a leavening agent but also an addition in other respects to the culinary resources in varied foods.

While as stated a "filler" may be used with the present preparation, the added matter being best dried milk, it is more for the purpose of dilution than for any protective action. The preparation is stable against air and deterioration in any event. The addition of dried unsoured milk simply changes the character of the preparation somewhat as regards flavor and cooking qualities. Where a sourish flavor in the final food is desired the extra filler may be simply more of the same artificially soured dried milk. Instead, however, of adding more of the dried soured milk, or, which is the same thing, lessening the proportion of carbonate, the initial material may be simply soured to a less degree. It is of course the same thing where a given amount of lactic acid is desired in the final preparation whether the milk be subjected to a souring fermentation intended to develop that amount of lactic acid or whether it be completely soured and the preparation afterward diluted with dried unsoured milk.

The final flavor in the cooked leavened food, as previously stated, is always pleasant and milky in character. Whether it be acid or not depends upon the ratio of carbonate to lactic acid. In the final product there is always a "full" flavor due to the presence of the proteids of the milk. As is well known, while the proteids have not much flavor of their own they give a "fullness" to the flavor of other things. For this reason the sour or acid flavor of the food containing not enough carbonate to neutralize all the lactic acid is unlike the thin acid taste which would be given by the acid components of the ordinary baking powder if used in excess; a flavor which is well known to be unpleasant. In the present preparation there is always more or less milk sugar, the amount of milk sugar of course being inversely as the amount of lactic acid, that is diminishing proportionately with the extent to which acid fermentation is carried; and this milk sugar contributes to the final flavor of the cooked material.

What I claim is:—

1. The process of making an acid material of pleasant flavor and nutritive value which comprises artificially souring skimmed milk to a high degree of acidity, homogenizing the fermented material and quickly drying to give a dry highly acid powdered product.

2. The process of making an acid material of pleasant flavor and nutritive value which comprises artificially souring skimmed milk with *B. Bulgaricus*, homogenizing the fermented material and quickly drying to give a dry powdered product.

3. The process of making an acid material of pleasant flavor and nutritive value which comprises artificially souring skimmed milk by acid fermentation, homogenizing the fermented material, quickly drying to give a dry powdered product and assembling the same with a bicarbonate.

4. The process of making an acid material of pleasant flavor and nutritive value which comprises artificially souring skimmed milk by acid fermentation, homogenizing the fermented material, quickly drying to give a dry powdered product and assembling the same with bicarbonate of soda.

5. The process of making an acid material of pleasant flavor and nutritive value which comprises artificially souring skimmed milk by acid fermentation, homogenizing the fermented material, quickly drying to give a dry powdered product and assembling the same with a carbonate in amount equivalent to the acid of such powder.

6. The process of making an acid material of pleasant flavor and nutritive value which comprises artificially souring skimmed milk by acid fermentation, homogenizing the fermented material, quickly drying to give a dry powdered product and assembling the same with bicarbonate of soda in amount equivalent to the acid of such powder.

7. The process of making an acid material of pleasant flavor and nutritive value which comprises artificially souring skimmed milk by acid fermentation, homogenizing the fermented material, quickly drying to give a dry powdered product and assembling the same with a carbonate in amount equivalent to the acid of such powder, the carbonate and powder being intimately and uniformly admixed.

8. The process of making an acid material of pleasant flavor and nutritive value which comprises artificially souring skimmed milk by acid fermentation, homogenizing the fermented material, quickly drying to give a dry powdered product and assembling the same with bicarbonate of soda in amount equivalent to the acid of such powder, the bicarbonate and powder being intimately and uniformly admixed.

9. The process of making an acid material of pleasant flavor and nutritive value which comprises artificially souring skimmed milk by acid fermentation, homogenizing the fermented material, quickly drying to give a dry powdered product and assembling the same with a carbonate and a filler and mixing to form an intimate and uniform admixture.

10. The process of making an acid material of pleasant flavor and nutritive value which comprises artificially souring skimmed milk by acid fermentation, homogenizing the fermented material, quickly drying to give a dry powdered product and assembling the same with bicarbonate of soda and a filler and mixing to form an intimate and uniform admixture.

11. The process of making an acid material of pleasant flavor and nutritive value which comprises artificially souring skimmed milk by acid fermentation, homogenizing the fermented material, quickly drying to give a dry powdered product and assembling the same with a carbonate and a filler of dried milk and mixing to form an intimate and uniform admixture.

12. The process of making an acid material of pleasant flavor and nutritive value which comprises artificially souring skimmed milk by acid fermentation, homogenizing the fermented material, quickly drying to give a dry powdered product and assembling the same with bicarbonate of soda and a filler of dried milk and mixing to form an intimate and uniform admixture.

13. An article for use in food comprising a homogeneous powdered, artificially soured skimmed milk of a high degree of acidity.

14. An article for use in food comprising powdered, artificially soured skimmed milk of a high degree of acidity resulting from a fermentation with B. Bulgaricus.

15. An article for use in food comprising powdered, artificially fermented and soured skimmed milk of a high degree of acidity and a carbonate.

16. An article for use in food comprising powdered, artificially fermented and soured skimmed milk and bicarbonate of soda.

17. An article for use in food comprising powdered, artificially fermented and soured skimmed milk and a carbonate in amount equivalent to the acid of such powder.

18. An article for use in food comprising powdered, artificially fermented and soured skimmed milk and bicarbonate of soda in amount equivalent to the acid of such powder.

19. An article for use in food comprising powdered, artificially fermented and soured skimmed milk, a carbonate and a filler, these ingredients being uniformly and intimately admixed.

20. An article for use in food comprising powdered, artificially fermented and soured skimmed milk, sodium bicarbonate and a filler, these ingredients being uniformly and intimately admixed.

21. An article for use in food comprising powdered, artificially fermented and soured skimmed milk, a carbonate and a filler of dried milk, these ingredients being uniformly and intimately admixed.

22. An article for use in food comprising powdered, artificially fermented and soured skimmed milk, sodium bicarbonate and a filler of dried milk, these ingredients being uniformly and intimately admixed.

In testimony whereof, I affix my signature hereto.

HARVEY W. WILEY.